United States Patent [19]

Denoor et al.

[11] 4,316,487
[45] Feb. 23, 1982

[54] TUBULAR OBTURATOR FOR USE WITH A HOLLOW BODY

[75] Inventors: Gaston Denoor, Paris; Georges Thillet, Grenoble, both of France

[73] Assignee: Neyrpic, Grenoble, France

[21] Appl. No.: 127,964

[22] Filed: Mar. 7, 1980

[30] Foreign Application Priority Data

Mar. 8, 1979 [FR] France ................................ 79 05997

[51] Int. Cl.³ ............................................. F16L 55/12
[52] U.S. Cl. ...................................... 138/89; 138/90; 138/96 R; 220/307; 220/308; 220/323
[58] Field of Search .............. 138/89, 90, 96 R, 96 T; 220/240, 307, 308, 323, 324; 403/344; 16/2; 215/271, 317, 341

[56] References Cited

U.S. PATENT DOCUMENTS

| | | | |
|---|---|---|---|
| 1,559,704 | 11/1925 | Hubbard | 220/307 |
| 1,976,817 | 10/1934 | Walker | 16/2 X |
| 2,658,434 | 11/1953 | Miller | 138/90 |
| 2,840,113 | 6/1958 | Simpson et al. | 138/89 |
| 2,944,265 | 7/1960 | Carmichael | 138/90 X |
| 3,326,243 | 6/1967 | Augustus | 138/90 |
| 3,829,184 | 8/1974 | Chevret | 16/2 X |
| 4,076,142 | 2/1978 | Naz | 215/271 X |
| 4,122,592 | 10/1978 | Ehret et al. | 138/90 X |

FOREIGN PATENT DOCUMENTS 714758  9/1954  United Kingdom ................. 138/89

Primary Examiner—James E. Bryant, III
Attorney, Agent, or Firm—Pollock, Vande Sande & Priddy

[57] ABSTRACT

A tubular obturator for use with a hollow body e.g. a pipeline or cylindrical container, terminating in a cylindrical opening for closing the opening when it is desired to subject the body to a pressure test, comprises a cover, the diameter of which is slightly smaller than that of the opening of the body to be tested, and a cylindrical skirt extending from the cover and comprising a plurality of strips.

2 Claims, 5 Drawing Figures

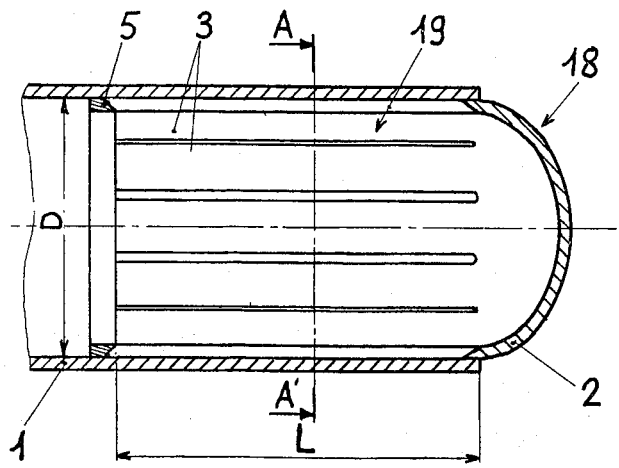
Fig. 1
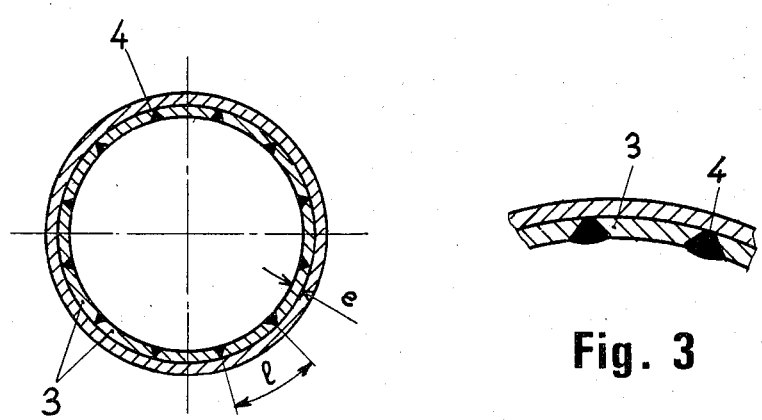
Fig. 2
Fig. 3

TUBULAR OBTURATOR FOR USE WITH A HOLLOW BODY

The present invention relates to a tubular obturator for use with a hollow body provided with a cylindrical nozzle or opening for closing the opening, when it is desired to subject the body to a pressure test.

The testing of tubes, long welded pipelines or plate metal apparatus fitted with plain pipes requires the mounting of covers at the open ends, to enable them to be placed under hydraulic pressure from the inside. These covers are normally circularly welded to the pipes so that, after the test, it is necessary to cut the pipes in the region of the weld.

It is an object of the invention to provide an obturator which makes it possible to test a body having a cylindrical open end without it being necessary to carry out any welding operations or machining operations on the body. According to the invention the obturator comprises a cover having a thickness sufficient to withstand the pressure under which the body is to be tested, and having an external diameter which is equal to the internal diameter of the opening of the body to be tested, with a reduction to allow for the play required for said cover to fit into the body, said cover being extended by a cylindrical skirt of the same diameter, said skirt being open at the end remote from said cover and being adapted to expand under the effect of the testing pressure.

The invention will be more fully understood from the following description of embodiments thereof, given by way of example only, with reference to the accompanying drawings.

In the drawings:

FIG. 1 is a longitudinal section through a first embodiment of the invention;

FIG. 2 is a section on the line A-A' of FIG. 1;

FIG. 3 is an enlarged view of a portion of FIG. 2;

Figure 4:
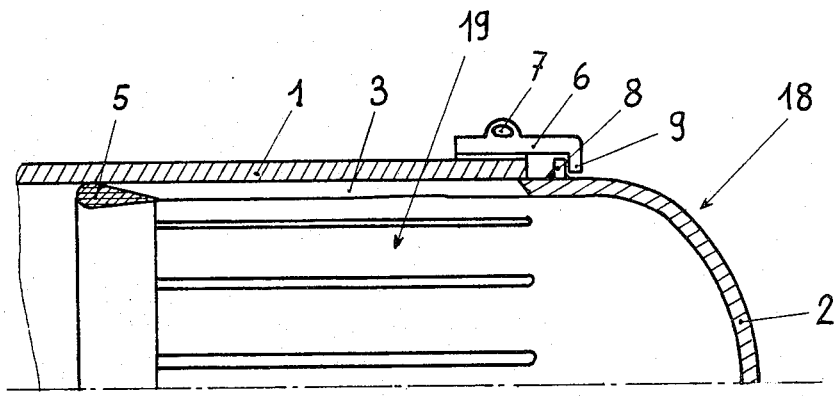
FIG. 4 is a partial longitudinal section of a second embodiment of the invention.

In FIGS. 1 to 3, reference 1 indicates the open end of a body to be tested, such as, for example, a tube or cylindrical container.

For the testing operation, and as shown in the drawing, that end 1 of the body which is normally open is closed by an obturator 18 which comprises:

a conventional cover 2 of hemispherical cross-section, the dimensions of which are suitable for withstanding the pressure at which the body is to be tested. The external diameter of the cover is equal to the diameter D of the end 1 of the body, with a reduction to allow for sufficient play to enable the cover to fit into the body, a cylindrical skirt 19 formed by a plurality of strips 3, of thickness e and length L, which extend from the cover 2, seals 4 in the slots between the strips 3, the seals 4 being made of an elastomer which is cast into the slots and adheres to the machined edges of the strips, and a circular sealing ring or gasket 5, which is produced from elastomer and extends continuously at the end of the strips 3 and the seals 4. The sealing ring 5 is molded on the end of the strips 3, which strips are machined so as to be conical on the inside, in order to ensure good adhesion of the sealing ring 5 to the strips 3 and the seals 4. At rest, when not in use, the sealing ring has a maximum external diameter which is slightly greater than the internal diameter of the end 1 of the body, in order to ensure initial seal at the moment when the body is placed under pressure.

The thickness e of the strips is determined as a function of the mechanical characteristics of their constituent material, in such a way that their mechanical strength enables them to withstand the longitudinal stress exerted by the testing pressure on the cover 2.

The width 1 of these strips is determined so as to ensure that they have adequate flexibility to enable them to bend under the action of the hydraulic pressure for testing the body, until they make contact with the internal face of the body in which the obturator is mounted.

The length L of the strips is determined so as to ensure the self-locking of the cover 2 inside the end 1 of the body under the effect of the pressure.

When the interior of the body is placed under hydraulic pressure, the cylindrical skirt 19 is flattened against the interior of the end of the body by virtue of the elasticity of the strips 3 and of the seals 4, 5, and this produces the self-locking of the obturator 18 in the body.

Figure 5:
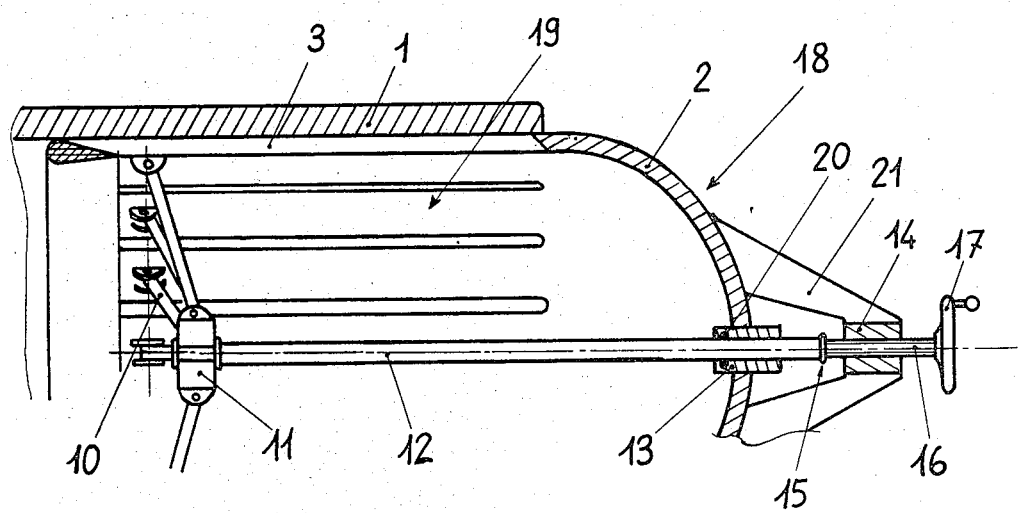
FIG. 5 is a partial longitudinal section of a third embodiment of the invention.

FIGS. 4 and 5 show obturators which are similar to that of FIG. 1 but are each also fitted with a device to ensure a more satisfactory initial seal.

FIG. 4 shows an obturator which is similar to that of FIG. 1 but is equipped with a ring 8 which is welded to the cover 2. A collar 6 is clamped to the end 1 of the body by means of a screw 7. The collar 6 is provided with a flange 9 against which the ring 8 bears. The collar 6 thus makes it possible to hold the obturator 18 in place when the assembly is initially placed under pressure, and to prevent the obturator from sliding out before the strips 3 have made contact with the body.

FIG. 5 shows an obturator which is similar to that of FIG. 1 but in which initial clamping is achieved by means of connecting rods 10 which connect the strips 3 to a hub 11 located at the end of a rod 12 sliding in a ring 13, the ring 13 being fitted with a sealing ring 20 and being centered on the cover 2.

By moving the rod 12 from right to left (as shown in FIG. 5) by means of a screw 16, movement of which is limited by a stop 15 and controlled by a wheel 17, via a thread 14 produced in a support piece 21 welded to the cover 2, it is possible to deform the strips 3 beforehand and consequently to lock them against the body.

The main use of the above described obturators is in the construction of full pipes, gas pipelines, oil pipelines and cylindrical containers or orifices to be placed under pressure.

What is claimed is:

1. A self-locking tubular obturator for a hollow body having a cylindrical free opening and intended to be subjected to a pressure test, said obturator comprising a cover having a thickness sufficient to withstand the pressure under which the body is to be tested, and having an external diameter which is equal to the internal diameter of the opening of the body to be tested, with a reduction to allow for the play required for said cover to fit into the body, said cover being extended by a cylindrical skirt of the same diameter, said skirt being open at the end remote from said cover and being adapted to expand under the effect of the testing pressure and an annular sealing ring provided at said open end of said cylindrical skirt.

2. A self-locking tubular obturator for a hollow body having a cylindrical free opening and intended to be subjected to a pressure test, said obturator comprising a cover (2) having a thickness sufficient to withstand the pressure under which the body is to be tested, and having an external diameter which is equal to the internal diameter of the opening of the body to be tested, with a reduction to allow for the play required for said cover to fit into the body, said cover being extended by a cylindrical skirt of the same diameter, said skirt being open at the end remote from said cover, being adapted to expand under the effect of the testing pressure, and comprising a plurality of strips and with seals provided in the spaces between said strips.

* * * * *